(12) United States Patent  (10) Patent No.: US 7,584,192 B2
Rey et al.  (45) Date of Patent: Sep. 1, 2009

(54) COLLECTION AND ANALYSIS OF DOCUMENT TRAFFIC IN AN ELECTRONIC MARKETPLACE

(75) Inventors: Michael Rey, Rauenberg (DE); Peter Haffner, St.Leon-Rot (DE); Rolf Schumann, Bad Schönborn (DE); Gunther Piller, Walldorf (DE); Peter Schwarz, Speyer (DE); Markus Brandenburger, Hassloch (DE)

(73) Assignee: SAP Aktiengesellschaft, Walldorf (DE)

( * ) Notice: Subject to any disclaimer, the term of this patent is extended or adjusted under 35 U.S.C. 154(b) by 1138 days.

(21) Appl. No.: 10/400,172

(22) Filed: Mar. 26, 2003

(65) Prior Publication Data

US 2004/0098663 A1 May 20, 2004

Related U.S. Application Data

(60) Provisional application No. 60/427,508, filed on Nov. 18, 2002.

(51) Int. Cl.
*G06F 17/30* (2006.01)

(52) U.S. Cl. .............................. 707/10; 707/3; 715/205

(58) Field of Classification Search .................. 707/4, 707/6, 102, 10, 3, 101; 705/36 R, 10, 37, 705/35, 36, 30; 396/155; 715/205
See application file for complete search history.

(56) References Cited

U.S. PATENT DOCUMENTS

| | | | | |
|---|---|---|---|---|
| 5,508,913 | A * | 4/1996 | Yamamoto et al. | 705/37 |
| 5,794,234 | A * | 8/1998 | Church et al. | 707/4 |
| 6,012,042 | A * | 1/2000 | Black et al. | 705/36 R |
| 6,078,924 | A | 6/2000 | Ainsbury et al. | |
| 6,144,947 | A * | 11/2000 | Schwartz | 705/36 R |
| 6,278,982 | B1 * | 8/2001 | Korhammer et al. | 705/36 R |
| 6,418,417 | B1 * | 7/2002 | Corby et al. | 705/36 R |
| 6,606,302 | B2 * | 8/2003 | Delattre et al. | 370/230.1 |
| 6,711,581 | B2 * | 3/2004 | Rebane | 707/102 |
| 6,910,042 | B2 * | 6/2005 | Albaugh et al. | 707/10 |
| 6,915,270 | B1 * | 7/2005 | Young et al. | 705/10 |
| 6,941,318 | B1 * | 9/2005 | Tamayo et al. | 707/102 |
| 7,013,286 | B1 * | 3/2006 | Aggarwal et al. | 705/14 |
| 7,069,242 | B1 | 6/2006 | Sheth et al. | |
| 7,124,140 | B2 * | 10/2006 | Barton | 707/101 |
| 7,496,543 | B1 * | 2/2009 | Bamford et al. | 705/37 |

(Continued)

OTHER PUBLICATIONS

Aberdeen Group, OnSite, IBX: Providing a Global Supply Base for Nordic Multinationals, pp. 1-12, Sep. 2001.

(Continued)

*Primary Examiner*—Shahid A Alam
(74) *Attorney, Agent, or Firm*—Fish & Richardson P.C.

(57) ABSTRACT

Systems and techniques to generate statistical reports on transactions conducted via an electronic marketplace are based on data extracted from the transaction documents. In general, in one implementation, the technique includes receiving documents sent through an electronic marketplace, and extracting data from the documents. The extracted data may relate to a predetermined statistical category of transactions conducted through the electronic marketplace. The extracted data may be stored for each document, and the stored data may be aggregated according to the predetermined statistical category. In some implementations, a report may be generated that relates to a document flow analysis for documents sent through the marketplace according to the buyer, seller, time period, document type, and/or other parameters.

21 Claims, 6 Drawing Sheets

U.S. PATENT DOCUMENTS

| | | | |
|---|---|---|---|
| 2001/0007981 A1* | 7/2001 | Woolston | 705/27 |
| 2001/0034694 A1* | 10/2001 | Elias | 705/37 |
| 2002/0004774 A1* | 1/2002 | Defarlo | 705/36 |
| 2002/0044774 A1* | 4/2002 | Kawasaki et al. | 396/155 |
| 2003/0046219 A1* | 3/2003 | Rosedale et al. | 705/37 |
| 2003/0072263 A1 | 4/2003 | Peterson | |
| 2003/0093424 A1 | 5/2003 | Chun et al. | |
| 2004/0107123 A1 | 6/2004 | Haffner et al. | |
| 2004/0181417 A1 | 9/2004 | Piller et al. | |
| 2005/0055368 A1 | 3/2005 | Bruening et al. | |

OTHER PUBLICATIONS

Aberdeen Group, OnSite, Deutsche Telekom Enriches Its Business with Large-Scale Implementations of Commerce One Technology, pp. 1-8, Jan. 2001.

FreeMarkets, News and Events, FreeMarkets Expands Product Portfolio with Spend Visibility Solution, freemarkets.com/en/news/press_releases/newsitem.asp?NewsID=408, pp. 1 of 2, Aug. 7, 2002.

SAS, Press Releases, Optimizing Suppliers, Minimizing Costs: SAS Enhances SRM Solution, sas.com/news/preleases/041502/news6.html, pp. 1 of 2, Apr. 15, 2002.

Commerce One, mondus.it, Large enterprises can suve up to 25 percent on their purchases by using RevolAuction, a complete auction service from mondus.it, based on Commerce One Technology, 2 pgs, year 2001.

Aberdeen Group, Spend Visibility: Maximizing Value in Strategic Sourcing, aberdeen.com/2001/research/08022766.asp, pp. 1-4, Aug. 2002.

Business Methods, Investment, Dialog Toolkit Interface, "*SPSS Ships SPSS Data Entry Network Server; New Software Makes Forms-Based Data Collection Faster and More Accurate*," Business Wire, Dec. 30, 1998, 3 pages.

* cited by examiner

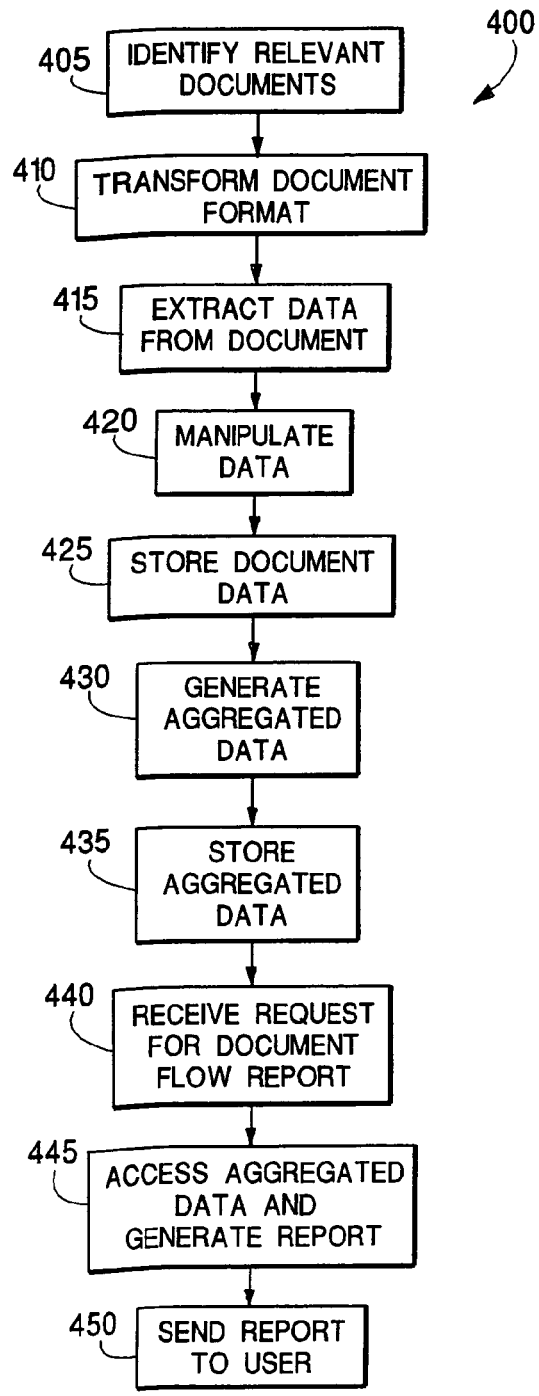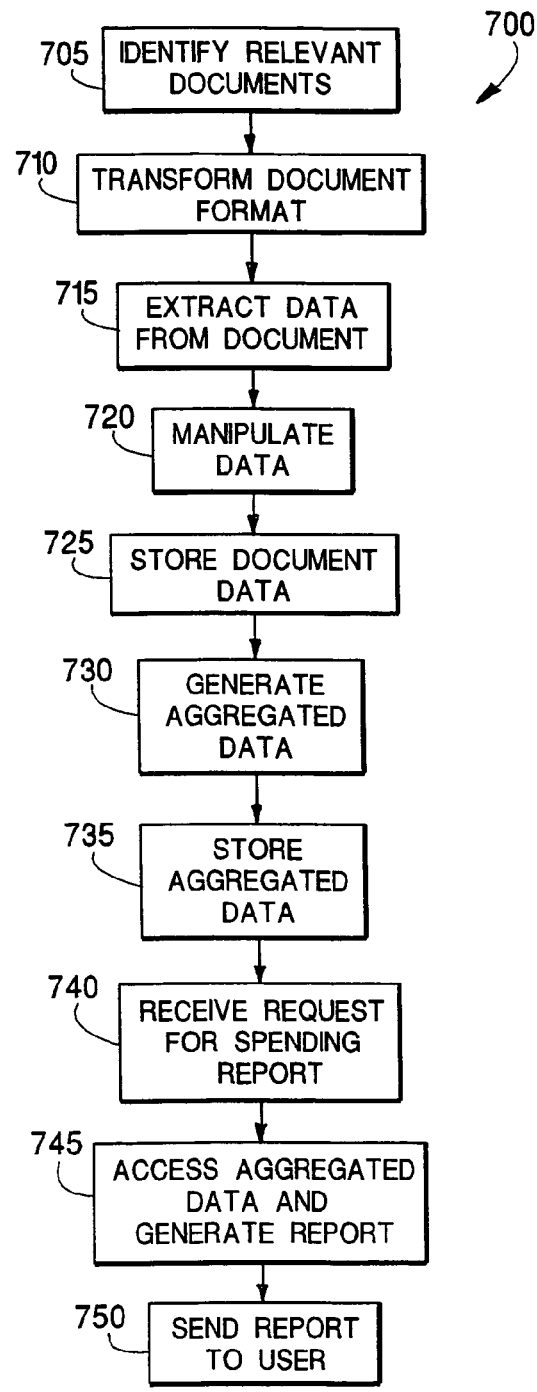
FIG. 4
FIG. 7

| | DATE | TIME | DOCUMENT TYPE | DOCUMENT ID | PROCESS TYPE | TRADING PARTNER 1 ID | TRADING PARTNER 2 ID | CORRELATION ID |
|---|---|---|---|---|---|---|---|---|
| 545(1) | 5/22 | 13:10 | PURCHASE ORDER | 15432 | S | ABC | XYZ | ABC00142 |
| 545(2) | 5/22 | 13:10 | PURCHASE ORDER | 15432 | R | XYZ | ABC | ABC00142 |
| 550(1) | 5/22 | 13:12 | INVOICE | 15445 | R | XYZ | DEF | DEF88439 |
| 550(2) | 5/22 | 13:12 | INVOICE | 15445 | S | DEF | XYZ | DEF88439 |
| 555(1) | 5/22 | 13:15 | PURCHASE ORDER | 15461 | S | DEF | UVW | DEF88492 |
| 555(2) | 5/22 | 13:15 | PURCHASE ORDER | 15461 | R | UVW | DEF | DEF88492 |
| | ... | ... | ... | ... | ... | ... | ... | ... |

FIG. 5

| DOCUMENT TYPE | PROCESS TYPE | TRADING PARTNER 1 | TRADING PARTNER 2 | NUMBER OF RECEIVED DOCUMENTS | NUMBER OF SENT DOCUMENTS |
|---|---|---|---|---|---|
| PURCHASE ORDER | S | ABC | XYZ | 0 | 10 |
| INVOICE | R | ABC | XYZ | 8 | 0 |
| CHANGE ORDER | S | ABC | XYZ | 0 | 5 |
| INVOICE | S | DEF | XYZ | 0 | 7 |
| ... | ... | ... | ... | ... | ... |

COLLECTION AND ANALYSIS OF DOCUMENT TRAFFIC IN AN ELECTRONIC MARKETPLACE

CROSS REFERENCE TO RELATED APPLICATIONS

This application claims the benefit of priority from U.S. Provisional Application entitled "Document Flow Analysis", filed Nov. 18, 2002, Application Ser. No. 60/427,508, the disclosure of which is incorporated by reference.

BACKGROUND

The following description relates to data processing in electronic or web-based marketplaces, for example, the collection and analysis of trading data in an electronic marketplace.

Businesses have turned more and more in recent years to conducting commerce on-line. For example, goods and services may be traded using on-line listings, auctions, and reverse auctions. Payment for goods and services may be carried out using electronic payment systems. In addition, on-line systems can also track post-sale activity, such as the progress of shipments, customer feedback, and returns.

On-line business is commonly conducted over various discrete virtual marketplaces, such as auction web sites. Some marketplaces specialize in particular types of goods and services, while others serve a broader range of customers. Also, some sites provide access to both buyers and sellers, while other sites only provide access to buyers (e.g., a site on which a company sells its wares) or to sellers (e.g., a site on which a company procures goods from suppliers). Over time, a site will receive visits from various parties and will be used to carry out various transactions. This activity for the site or marketplace can provide helpful information about the site and how it is being used.

SUMMARY

The present application describes systems and techniques relating to collecting and reporting statistical data on documents that are transmitted via an electronic marketplace. For example, data from documents may be extracted to monitor the number and types of documents transmitted through the marketplace for a certain category of transactions.

In one aspect, a method for processing data in an electronic marketplace involves receiving documents sent through the electronic marketplace, and extracting data from the documents. The extracted data may relate to a predetermined statistical category of transactions conducted through the electronic marketplace. The extracted data for each document may be stored, and the stored data may be aggregated according to the predetermined statistical category.

Implementations may include one or more of the following features. For example, a query for a statistical category of data may be received, and information from the aggregated data may be presented in response to the received query. The documents may be filtered to identify relevant documents prior to extracting data from the documents. Each document may be transformed from a format used by the electronic marketplace into a predefined format used for extracting data. Transforming each document may also include retrieving data from a master database and inserting the retrieved data into the document. The retrieved data may be selected based on information contained in the document. Storing the extracted data for each document may involve identifying a transaction with which each document is associated, and linking data from documents that are associated with the same transaction.

The extracted data for each document may include information identifying a document type, and aggregating the stored data may include aggregating the stored data by document type. The extracted data for each document may include information identifying one or more trading partners associated with the document, and aggregating the stored data may include aggregating the stored data by trading partner. The extracted data for each document may include information identifying a date associated with the document, and aggregating the stored data may include aggregating the stored data by time period. The predetermined statistical category may relate to a quantity of documents sent through the electronic marketplace. The quantity of documents may be aggregated according to a trading partner, a pair of trading partners, a time period, and/or a document type. A query for a statistical category of data may be received, and information from the aggregated data may be presented in response to the received query. The presented information may include a number of documents sent through the electronic marketplace by a trading partner, a pair of trading partners, a time period, and/or a document type associated with the documents.

In another general aspect, a system for processing data in an electronic marketplace includes an electronic marketplace portal and a database for storing documents transmitted via the electronic marketplace. A data warehouse may store statistical data relating to documents sent via the electronic marketplace. Information corresponding to predetermined statistical categories may be extracted from the documents stored in the database to generate the statistical data. A reporting application for accessing the data warehouse may be used to retrieve statistical data and for generating reports representing aggregated statistical data.

Implementations may include one or more of the following features. For example, the system may include a knowledge base for retrieving information corresponding to one or more predetermined statistical categories based on data contained in the documents. The data warehouse may include an operational data storage repository for storing information on individual documents and an aggregated data repository for storing statistical data aggregated by statistical categories. The statistical categories may correspond to a trading partner, a pair of trading partners, a time period, and/or a document type. The statistical data may include a quantity of documents transmitted via the electronic marketplace for one or more statistical categories. The reporting application may be operable to generate a report relating to a quantity of documents transmitted via the electronic marketplace by document type and trading partner, between a pair of trading partners, and/or by document type.

In another general aspect, a machine-readable medium may store instructions operable to cause one or more machines to perform certain operations. The operations may include receiving documents sent through an electronic marketplace and extracting data from the documents. The extracted data may relate to a predetermined statistical category of transactions conducted through the electronic marketplace. The extracted data may be stored, and the stored data may be aggregated according to the predetermined statistical category.

Implementations may include one or more of the following features. For example, additional information may be stored for each document. The additional information may be based on master data that corresponds to data contained in the document. A trading partner directory may include the master data, and the additional information may include a trading partner identifier associated with the document. The predetermined statistical category may correspond to a time period, a trading partner, a pair of trading partners, and/or a document type. The stored data may be aggregated by determining a quantity of documents transmitted through the electronic marketplace for the predetermined statistical category. A report may be generated based on the aggregated data. A request for additional detail relating to the report may be received, and reporting may be performed on extracted data that corresponds to individual documents relating to the aggregated data. A date, a document type, and/or one or more trading partner identifier may be extracted and stored for each document. The predetermined statistical category may be defined by one or more parameters, such as a time period, a trading partner, a pair of trading partners, and/or a document type, and a quantity of documents for the predetermined statistical category may be calculated.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 4 is a flow diagram illustrating a process for collecting and reporting document flow data in an electronic marketplace.

FIG. 5 shows an example of a database table for storing document data.

FIG. 6 shows an example of an aggregated data storage table for storing aggregated data over a selected time period.

FIG. 7 is a flow diagram illustrating a process for collecting and reporting global spend data in an electronic marketplace.

Like reference symbols in the various drawings indicate like elements.

DETAILED DESCRIPTION

Figure 1:
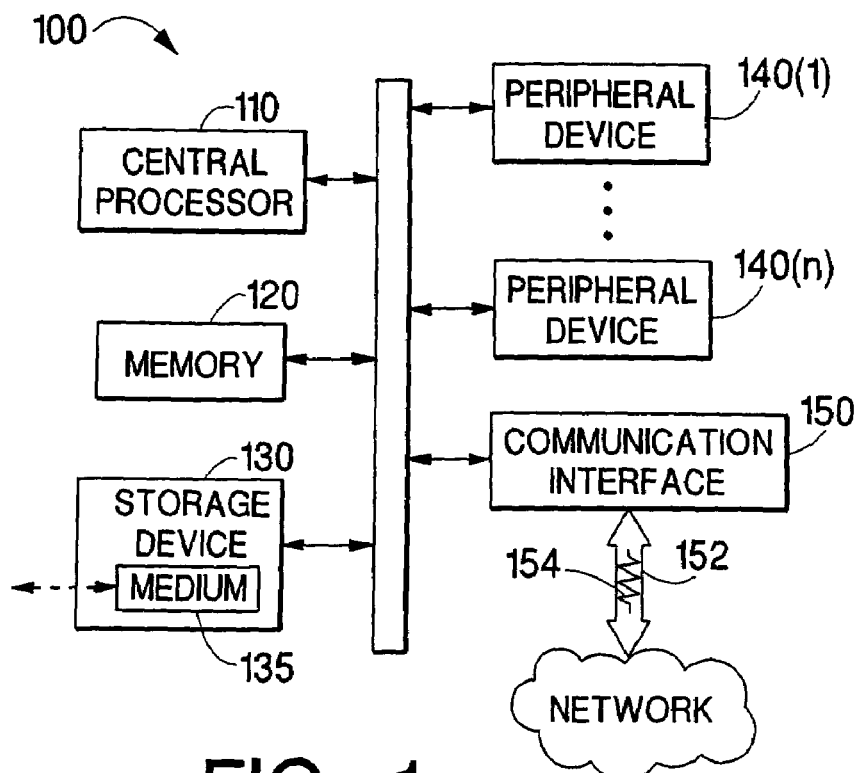
FIG. 1 shows a block diagram illustrating an example data processing system that may be used to implement an electronic marketplace.

The systems and techniques described here relate to the collection, storage, and analysis of trading data in an electronic marketplace. Trading over the marketplace may be facilitated by the flow of Extensible Markup Language (XML) documents that are used for communications between marketplace participants (e.g., buyers and sellers) and for communications with external service providers. XML documents have a fixed structure that includes content or body (i.e., the information being exchanged) and the envelope, which includes routing information (e.g., the recipient and the location of the recipient). Although only the body is sometimes referred to as the XML document, an XML document as described here may also include the envelope. One of the services of the marketplace is the actual routing of these XML documents.

The described systems and techniques can be used to analyze the sending and routing of information, such as which document types are being sent by which marketplace participants. In this type of implementation, a document flow analysis can keep a running count of the different types of messages or documents that are transmitted through an on-line marketplace. For example, a marketplace administrator may want to track the number of orders that are processed over the marketplace in one month. Each type of document has a prescribed document type, which may be selected from a limited set of document types. These document types can be checked to provide statistical tracking of the various documents, and the document flow data can be transferred to a structured data repository. Analysis of the data stored in the repository can then be performed to provide various reports relating to the flow of documents through the marketplace, such as in the form of tables or charts.

Document flow analysis information can be used by the owner or operator of the marketplace and/or by marketplace participants (e.g., companies that are registered on the marketplace and that use the marketplace services). For example, the marketplace owner can use the information to obtain an overview of which services are being used on the marketplace; to analyze the number of customers that are using the marketplace; to analyze total document flow through the marketplace; to determine how often various services are being used by each marketplace participant; to evaluate whether a transaction-based business model would be profitable for the marketplace; to identify trends in the marketplace, including trends by particular participants; and to determine where there are purchase orders without corresponding invoices, which might indicate that marketplace participants are making deals on the marketplace but are not closing the deals. The marketplace owner could then respond to the information by adapting the infrastructure to the needs of the participants, sending notifications to particular customers based on their usage patterns, modifying the billing structure for the marketplace, developing new features for the marketplace, or promoting underutilized marketplace capabilities.

The marketplace owner also may have to regularly upgrade and sustain the essential features of the marketplace. For example, the marketplace owner may be responsible for performing maintenance on the marketplace infrastructure, executing and improving the underlying business model of the marketplace, and adapting to increases in marketplace usage. Regular information regarding marketplace traffic may prove useful for performing these functions. For example, the marketplace owner may benefit from information regarding the number of documents transferred through the marketplace, the most frequently used types of transactions, the number of transactions per document type, the most frequented areas of the marketplace, the distribution of transactions between buyers and sellers, changes in marketplace activity over time, and the distribution of billing-related transactions between buyers and sellers.

Document flow analysis information can also be used by marketplace participants to determine how busy the marketplace is, to determine what types of trading occurs on the marketplace, to identify the other participants in the marketplace and their level of activity, and to analyze their own usage of the marketplace.

The systems and techniques can also be used to analyze the actual document content. This analysis can provide information about the basic business that is being carried out on the marketplace, such as the volume ordered for a particular product. In one implementation, the content of XML Common Business Library (xCBL) purchase orders, purchase order changes, and invoices can be extracted to analyze an enterprise's global purchasing activities (i.e., to provide a global spend analysis). XCBL is an XML component library for business-to-business e-commerce. Document contents can be extracted and stored in a structured data repository. Analysis of the data stored in the repository can then be performed to provide all sorts of reports relating to the spending in the marketplace.

An enterprise that trades on the marketplace can use the global spend analysis to track the relationship between the enterprise's purchase orders and invoices and to track how much the enterprise has actually spent (as indicated by invoices) and how much it is committed to spend in the future (as indicated by purchase orders). The global spend analysis information can be used to determine how much an enterprise is giving away in rebates (i.e., in cases where the customer creates a purchase order at full cost but the deal closes at a lower invoice). The information could also provide an indication that a certain amount of purchases from a company are occurring off-line. For example, an enterprise might have an agreement to obtain a certain volume of services from a supplier for a discounted rate, but many of the service calls may not have a purchase order because they are requested by telephone. If the volume is being tracked according to purchase orders, the enterprise may not be getting the discount it deserves.

A large company may also use the global spend analysis to aggregate purchasing activity data from multiple marketplaces. Similarly, an enterprise where different subsidiaries are initiating marketplace purchases behind enterprise firewalls can use the described systems and techniques to obtain an overview of global purchasing activity. An analysis of this purchasing information can be used to support strategic sourcing, which is a systematic approach that defines an enterprise's supply base relationships in ways that result in an improved competitive position. For example, by indicating whether different purchasing organizations buy the same commodities from different suppliers and which suppliers offer the best prices, the enterprise may identify savings potentials through switching to another supplier or bundling purchases of the same commodities.

In general, the global spend analysis might be of greatest relevance to a marketplace participant, and particularly to an enterprise's procurement officer, who may want to monitor actual and committed spend information. The marketplace owner may also be interested in the data collected for global spend analysis in cases where billing is or may be based on spending via the marketplace.

Figure 2:
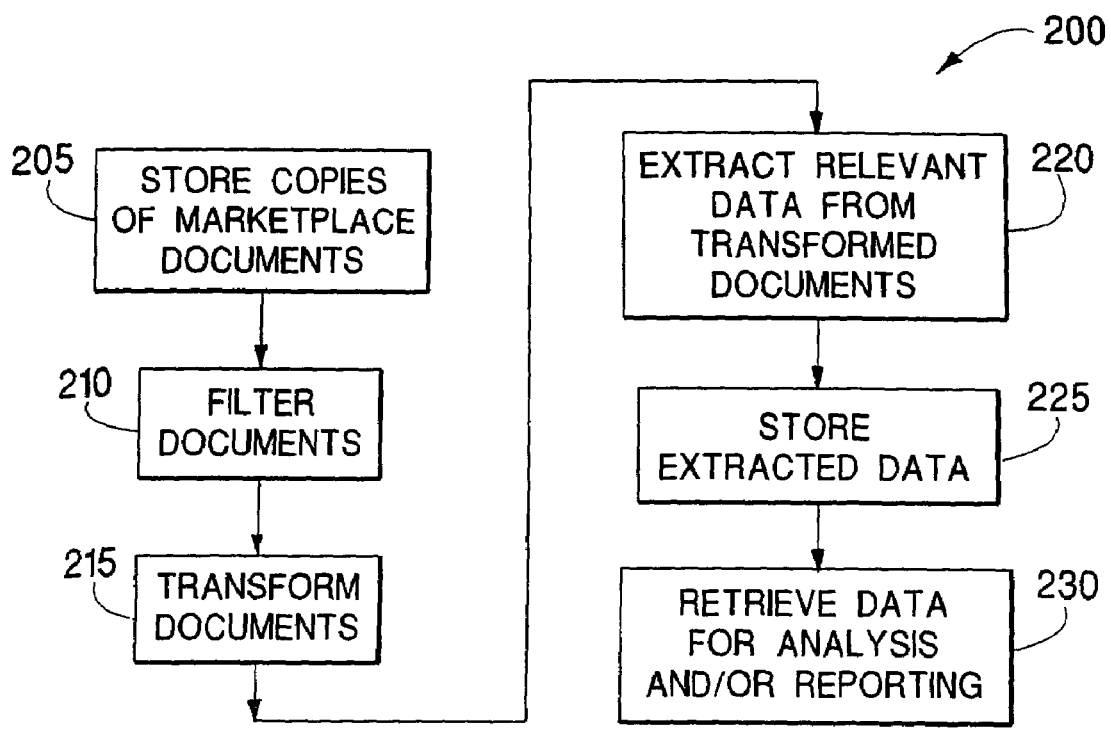
FIG. 2 is a flowchart showing a process for collecting and analyzing trading data in an electronic marketplace.

FIG. 2 is a flow diagram 200 illustrating a process for collecting and analyzing trading data in an electronic marketplace. During the operation of the marketplace, a copy of every document passing through the marketplace is stored (step 205). The documents are then filtered to identify documents that contain relevant information (step 210). For example, there may be selected types of documents for which there is a desire to monitor the document flow. The filter would identify documents of the selected type and designate them for further processing. Alternatively, to perform global spend analysis, the filter would identify documents that contain or potentially contain data relating to purchasing activities. The identified documents may then be transformed from a format used by the marketplace into a format used for reporting purposes (step 215). This transformation may include the substitution of data in a form that is more useful for reporting in place of coded data in the document, such as the substitution of trading partner IDs for sender and receiver Document Destination IDs (DDID's) contained in the document (e.g., in the XML document envelope). The documents may also be filtered before they are stored. In addition, documents may be filtered and transformed individually, such as in real-time, or may also be processed in batches or groups. Relevant data is next extracted from the transformed documents (step 220), and the extracted data is stored (step 225) for subsequent retrieval by an analysis or reporting application (step 230).

Figure 3:
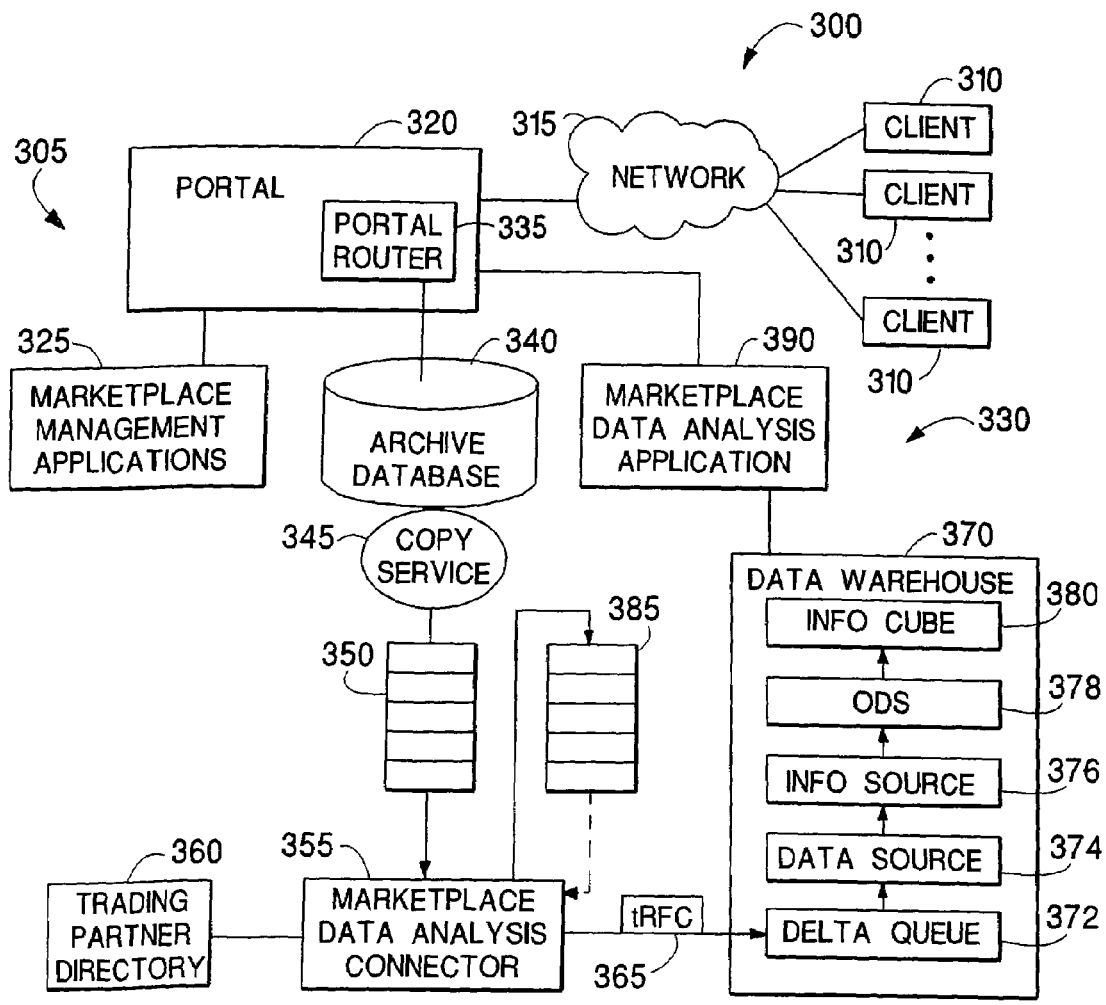
FIG. 3 is a block diagram illustrating the functional components of a system for collecting and reporting trading data in an electronic marketplace.

FIG. 3 is a block diagram illustrating the functional components of a system 300 for collecting and reporting trading data in an electronic marketplace 305. Multiple clients 310 can access the electronic marketplace over a network 315, such as through a portal 320. The network 315 can be any communication network linking machines capable of communicating using one or more networking protocols. The network 315 can be a local area network (LAN), metropolitan area network (MAN), wide area network (WAN), enterprise network, virtual private network (VPN), the Internet, and the like. The clients 310 can be any machines or processes capable of communicating over the network 315. The clients 310 can be web browsers and can be communicatively coupled with the network 315 through a proxy server. In addition, the clients 310 can be routers associated with marketplace participants.

The portal 320 provides a common interface to marketplace services, including marketplace management applications 325 and marketplace data collection and analysis services 330. The portal 320 receives documents that pass through the marketplace 305 from the clients 310. Before forwarding each received document to the destination system, a portal router 335 stores a copy of the document in an archive database 340. A copy service 345 reads documents from the archive database 340 for example in a one-by-one fashion, and determines whether each document contains information to be monitored by the system 300. For example, the copy service 345 may be pre-configured with certain filter criteria that identify specific types of documents (e.g., purchase orders, invoices, and the like), which are to be read from the archive database 340. The identified documents are placed into a message queue 350, such as SonicMQ, which ensures that every document read from the archive database 340 is processed and stored by the system 300 and is not duplicated. To preserve the sequence of documents, a global document index is stored with the copy service 345.

A marketplace data analysis connector 355 reads documents from the message queue 350. If necessary, the marketplace data analysis connector 355 can transform the documents from a format (e.g., xCBL) used for transmitting documents via the marketplace 305 into a format (e.g., Business Warehouse XML) used by the system 300 for data analysis and storage. This transformation may be based on Extensible Style Language Transformation (XSLT) mappings stored in the marketplace data analysis connector 355, which mappings further rely upon information stored in a trading partner directory 360. In general, the trading partner directory represents a knowledge base relating to trading partners in the marketplace, and indicates how to identify each trading partner based on information contained in documents sent via the marketplace. The trading partner directory 360 stores master data about buyers and sellers on the marketplace 300. The stored information allows the marketplace data analysis connector 355 to map, for example, routing data contained in the document (e.g., origination and destination routers identified in the document header) into more detailed data (e.g., identifiers of the document sender and receiver).

A transactional remote function call (tRFC) 365 to a data warehouse 370 places the transformed document into a delta queue 372 of the data warehouse 370. If the tRFC to the data warehouse 370 fails for some documents due to, for example, a data warehouse 370 downtime, the documents are stored in a dead message queue 385. A system administrator can view the documents in the dead message queue 385 and their corresponding error messages to determine why the documents did not arrive in the delta queue 372. Once the error is resolved, the marketplace data analysis connector 355 can re-read the documents from the dead message queue 385 and again attempt to send them to the delta queue 372. To enable the data warehouse 370 to distinguish the documents from the dead message queue 385 from regularly delivered documents, an additional "re-delivered" field can be populated with the values "true" or "false." The "re-delivered" field can be used in the data warehouse 370 to switch off specific time-consuming look-ups that are used, for example, to preserve the sequence of documents.

The delta queue 372 helps prevent documents from being duplicated in the data warehouse 370 by segregating a batch of documents that are being processed by the data warehouse 370 from documents that are being loaded into the delta queue 372 from the marketplace data analysis connector 355. A data source processing block 374 defines certain predefined data objects that are extracted from the documents in the delta queue 372. In the case of a document flow analysis, for example, the predefined data objects may include trading partner IDs, document IDs, document types, date and time stamps, and the number of documents contained in a single envelope. The predefined data objects for a global spend analysis implementation may include additional information, such as purchase order numbers, schedule line quantities, order quantities (a total of the schedule line quantities) and units of measurement, order values, prices and price units, order currency, invoice quantities and units of measurement, invoice values, and invoice currency.

An information source processing block 376 receives the extracted data, as defined by the data source processing block 374, and allows the extracted data to be manipulated or changed based on master data stored in the data warehouse 370. As with the trading partner directory, the master data stored in the data warehouse represents a knowledge base relating to trading partners, their products, and the transactions conducted on the marketplace. For example, the information source processing block 376 may use the master data to add data regarding the document sender's country based on the sender's trading partner ID or to add data regarding the identity of an ordered product based on the product number contained in the document. The master data stored in the data warehouse 370 may include generic buying company objects, which store information on all buying companies in the system 300; generic vendor objects, which store information on all selling companies in the system 300; and generic material group objects, which store information on all material groups in the system 300. Each buying company may be modeled as an instance of a generic buying company object, each selling company may be modeled as an instance of a generic vendor object, and each material group may by modeled as an instance of a generic material group object. In some cases, the master data may be uploaded into the data warehouse 370 from flat files, or the master data may be one or more flat files. The extracted data may be manipulated using an XSLT-code or Java-code that transforms the data in the information source processing block 376 for subsequent storage.

The information source processing block 376 also defines what data is stored in an operational data store (ODS) 378. The operational data store 378 stores data on a document-by-document basis and defines the types of document-specific data that are available for reporting and analysis. The operational data store 378 may be implemented as a table, with each row representing a different document and each column representing a different data object associated with the document.

The data in the operational data store 378 is loaded into an information cube 380, which aggregates the individual document data in the operational data store 378 to produce more general or abstracted data. In other words, the information cube 380 may store summary data for a collection of documents, with the collection of documents selected according to some predefined criteria. For example, the information cube 380 may store aggregated data (e.g., number of purchase orders, total amount spent) by date. The information cube 380 defines the types of aggregated data that are available for reporting and analysis.

Reporting and analysis on the data stored in the operational data store 378 and the information cube 380 can be performed using a marketplace data analysis application 390, which can add data together according to predefined or user-specified parameters (e.g., user queries) to generate desired reports, such as the total number of documents sent through the marketplace by, or the committed spend amount for, a particular trading partner. A user client 310 can access the marketplace data analysis application 390 through the network 315 and the portal 320 to submit queries and view reports.

In one implementation, predefined queries analyze the data in the information cube 380. The data in the operational data store 378 is accessed by the data analysis application 390 to provide additional information, such as when a user has special questions about the underlying data or wants to view additional detail regarding an information cube 380 query. The data analysis application 390 may also access the operational data store 378 in response to user-specified queries that require aggregating data in a manner that is not supported by the information cube 380.

Access to reports can be controlled based on authorizations assigned to users of the system 300. For example, authorizations may be based in part on the user's assigned role. Available roles may include a marketplace owner and a marketplace participant. A marketplace owner may have no restrictions on the types of reports he or she can access. On the other hand, the marketplace owner may be able to access general global spend information, such as the total amount a particular enterprise spends via the marketplace, but not be able to access detailed global spend information, such as the amount the enterprise spends by product type. A marketplace participant may be allowed to access general reports on document flow and global spend data (e.g., total documents sent and total spending via the marketplace) and reports relating to the enterprise with which the user is associated, while being restricted from accessing reports relating to other enterprises on the marketplace. Thus, a marketplace participant's authorizations may be based in part on the trading partner ID for the enterprise with which the user is associated.

FIG. 4 is a flow diagram 400 illustrating a process for collecting and reporting document flow data in an electronic marketplace. Documents that pass through the marketplace are filtered to identify documents that are relevant to a document flow analysis (step 405). For example, purchase orders and invoices may be deemed relevant to a document flow analysis, while a mere inquiry regarding product specifications might not be considered relevant. Accordingly, the latter types of documents might be filtered out, while the former types of documents are selected for further analysis. The identification of relevant documents may be performed, for example, by a copy service 345 that reads documents from an archive database 340 (see FIG. 3).

Each document identified in step 405 may then be transformed to place the document in a recognized format for extracting data from the document (step 410). In some cases, documents transferred through the marketplace may be in a different format (e.g., xCBL) than the format used for collecting data relevant to the document flow analysis (e.g., a different type of XML). This transformation may also include inserting trading partner IDs into the transformed document based on information included in the document envelope and/or in the document content. Documents transferred through the marketplace may use different ways of identifying the sending and receiving parties based upon, for example, whom the sender is.

Moreover, trading partner IDs that are used in the marketplace might not specify the sending and receiving parties with an appropriate level of granularity for purposes of the document flow analysis. For example, the marketplace trading partner ID may be too general (e.g., in that it identifies a group of different entities) or too specific (e.g., in that it identifies a particular employee of an enterprise). The transformation step 410 may therefore involve reading other data from the document and/or using pre-stored master data (e.g., the trading partner directory 360 of FIG. 3) to identify and insert an appropriate trading partner ID into the transformed document.

In some implementations, more than one trading partner ID may be included in the transformed document. For example, the transformed document may include both a marketplace trading partner ID in addition to a trading partner ID that is specific to the document flow analysis system. Similarly, the transformed document may include trading partner IDs that have different levels of granularity (e.g., one that identifies an enterprise and another that identifies a division within the enterprise). In some implementations, the transformation step 410 may be performed by a marketplace data analysis connector 355 in conjunction with a trading partner directory 360 (see FIG. 3).

Data relevant to the document flow analysis is next extracted from the transformed document (step 415). The extracted data may include the date and time the document is sent, information for determining the document type (e.g., purchase order, change order, invoice, and the like), a document ID, first and second trading partner IDs, and information for generating a correlation ID. The correlation ID may be a unique identifier that enables related documents (e.g., a purchase order and an order response) to be identified. For example, the correlation ID may be a purchase order number appended to the trading partner ID of the buyer. Presumably, documents that relate to the purchase order, such as an order confirmation or an invoice, will contain the purchase order number and an identification of the buyer. Thus, by extracting the appropriate data from each of the various documents, the same unique correlation ID can be generated for all documents that relate to the same purchase order or other transaction. In some implementations, the data extraction step 415 may be performed on documents in a queue (e.g., a delta queue 372) according to rules contained in a data source processing block 374 (see FIG. 3).

The extracted data can then be manipulated or changed to include additional or alternative data that facilitates the subsequent identification of data responsive to user queries (step 420). The manipulation of the extracted data may involve the use of rules for converting the extracted data into a different format and/or mapping tables for selecting appropriate data from master data files. For example, the data manipulation may be used to generate the correlation ID. The document type may be inserted using a mapping table. Other data objects relating to the trading partner, the products, or the type of transaction, for example, may also be inserted by mapping extracted data using master data files. In some implementations, the data manipulation step 420 may be performed by an information source processing block 376 (see FIG. 3).

Once the document data is extracted and any necessary data manipulation is performed, the data for the document is stored in a database (step 425). In some implementations, the database may be an operational data store 378 (see FIG. 3). Each document may trigger two entries in the database—one that is associated with the document sender and one that is associated with the document receiver. Each entry can include a field that identifies a process type identifying whether the first trading partner for that entry is the sender or receiver. In some cases, a particular trading partner may be in the role of a buyer or seller in different transactions. By using first and second trading partner IDs, instead of IDs that are specific to the buyer and seller roles, document flow data for the particular trading partner can be associated with a single trading partner ID. The first and second trading partner IDs together with the process type and document type data may be used to determine whether each trading partner is in the role of buyer or seller.

For example, for a particular entry, if the process type is "sender" and the document type is "purchase order," it can be determined that the first trading partner for the entry is a buyer. In a corresponding entry, the other trading partner would be listed first, and the document type would be "receiver." Based on this information along with the document type "purchase order," it can be determined that the first trading partner for the corresponding entry is a seller. Generally, entries are searched, aggregated, and analyzed using the first trading partner as the primary selection criteria; the trading partner that is listed second in each entry is simply included in the entry as additional information. Thus, to search or aggregate document data by trading partner, the first trading partner is used. The second trading partner may be used as a secondary selection criterion, such as in determining how many documents are sent between two particular trading partners.

FIG. 5 shows an example of a database table 500 for storing document data. The database table 500 includes a date field 505, a time field 510, a document type field 515, a document ID field 520, a process type field 525 (with entries "S" for sender and "R" for receiver), a first trading partner ID field 530, a second trading partner ID field 535, and a correlation ID field 540. Each row of the database table 500 represents an entry in the database, and each document is represented by a pair of entries 545, 550, and 555—one for the document sender and one for the document receiver. Thus, a first entry 545(1), 550(1), or 555(1) and a corresponding second entry 545(2), 550(1), or 555(1) have the same document type, the same document ID, and the same correlation ID but have different process types. In addition, the first and second trading partner IDs are switched for the first entry 545(1), 550(1), or 555(1) and the corresponding second entry 545(2), 550(1), or 555(1). In some implementations, the database table 500 may include additional information fields, such as for storing additional trading partner IDs with a different level of granularity. In addition, the database table 500 may include a sender ID and a receiver ID (not shown). The sender ID and the receiver ID may identify the specific systems used by the respective trading partners, which may be necessary for reporting statistics. For example, the order number or the document ID may be used to connect orders and invoices but may only be unique within a particular system, and thus, an identifier for the specific system may allow for uniquely identifying particular orders and invoices among all systems.

Referring again to FIG. 4, the stored document data is aggregated according to predefined criteria and over a predetermined time period (step 430) and the aggregated data is stored (step 435) (e.g., in an information cube 380 (see FIG. 3)). In one possible implementation, the number of documents sent and received each day, week, month, quarter, or year may be determined for all documents having the same document type, the same process type, and the same first and second trading partners.

FIG. 6 shows an example of an aggregated data storage table 600 for storing the aggregated data over a selected time period. Each row or entry 635 in the aggregated data storage table 600 corresponds to a particular document type 605, process type 610, first trading partner 615, and second trading partner 620, which represent organizational fields according to which data is aggregated. In addition, each entry 635 identifies a number of received documents 625 and a number of sent documents 630, which represent the key data figures. As with the database table 500, each entry 635 may include additional organizational fields for providing greater resolution (or fewer organizational fields for providing more aggregation). In some implementations, the aggregated data storage table 600 may be included in an information cube 380 (see FIG. 3).

Returning again to FIG. 4, a request for a document flow report is subsequently received (step 440). The request may be in the form of a predefined or a user-specified query. Responsive to the request, the stored aggregated data, and in some cases the stored document data, is accessed and a document flow report is generated (step 445). The document flow report can then be sent to the user that requested the report (step 450). In some implementations, the document flow report may be generated by a marketplace analysis application 390 and sent through a portal 320 and a network 315 to a user client 310 (see FIG. 3).

The document flow report may be generated based on a single entry or an aggregation of entries in the aggregated data storage table 600 or based on a single entry or an aggregation of entries in the database table 500. Document flow reports may provide data regarding a number of documents sent and/or received per document type and marketplace participant in a time period, a number of documents sent and/or received per partner relationship in a time period, a trend analysis of the number of documents sent and/or received per partner relationship, or a trend analysis of the number of documents sent and/or received per document type. In addition, a marketplace administrator may be able to obtain various reports, for example, a top ten list relating to the number of documents per buyer and/or seller in a time period (i.e., to identify the most active marketplace participants). A marketplace participant may be able to obtain information regarding the overall number of its own documents sent and/or received via the marketplace in a time period, a number of its own documents per document type, or a comparison of a number of its own documents with the number of documents sent by others via the marketplace. Other types of document flow reports may also be generated.

FIG. 7 is a flow diagram 700 illustrating a process for collecting and reporting global spend data in an electronic marketplace. Documents that pass through the marketplace are filtered to identify documents that are relevant to a global spend analysis (step 705). For example, purchase orders and invoices may be deemed relevant to a global spend analysis, while confirmations that an order has been received might not be considered relevant. Accordingly, the latter types of documents might be filtered out, while the former types of documents are selected for further analysis. The identification of relevant documents may be performed, for example, by a copy service 345 that reads documents from an archive database 340 (see FIG. 3).

Each document identified in step 705 may then be transformed to place the document in a recognized format for extracting data from the document (step 710). In some cases, documents transferred through the marketplace may be in a different format (e.g., xCBL) than the format used for collecting data relevant to the document flow analysis (e.g., a different type of XML). This transformation may also include inserting trading partner IDs into the transformed document based on information included in the document envelope and/or in the document content. Documents transferred through the marketplace may use different ways of identifying the sending and receiving parties based upon, for example, what type of backend system (e.g., SAP R/3 or other Enterprise Resource Planning (ERP) solution, Enterprise Buyer Professional (EBP), and the like) the sending party uses to generate the documents that are sent via the marketplace.

Moreover, trading partner IDs that are used in the marketplace might not specify the sending and receiving parties with an appropriate level of granularity for purposes of the global spend analysis. For example, the marketplace trading partner ID may be too general (e.g., in that it identifies a group of different entities) or too specific (e.g., in that it identifies a particular employee of an enterprise). The transformation step 710 may therefore involve reading other data from the document and/or using pre-stored master data (e.g., the trading partner directory 360 of FIG. 3) to identify and insert an appropriate trading partner ID into the transformed document.

In some implementations, more than one trading partner ID may be included in the transformed document. For example, the transformed document may include both a marketplace trading partner ID in addition to a trading partner ID that is specific to the document flow analysis system. Similarly, the transformed document may include trading partner IDs that have different levels of granularity (e.g., one that identifies an enterprise and another that identifies a division within the enterprise). In some implementations, the transformation step 710 may be performed by a marketplace data analysis connector 355 in conjunction with a trading partner directory 360 (see FIG. 3).

Data relevant to the document flow analysis is next extracted from the transformed document (step 715). The extracted data may include the date and time the document is sent, information for determining the document type (e.g., purchase order, change order, invoice, and the like), a document ID, and information for determining a correlation ID. For a purchase order or change order, the extracted data may further include first and second trading partner IDs, buyer line item and schedule line item numbers, material group data, information for identifying a contract (e.g., which governs transactions between the buyer and seller), requested delivery date, order quantity, units in which the order is measured, schedule line quantities, order price and price unit, order value, and order currency. For an invoice, the extracted data may further include an invoice item quantity, an invoice item unit, an invoice value, and an invoice currency. In some cases, an invoice may not have a corresponding purchase order and/or change order, such as when the original order is not placed through the marketplace (e.g., when the original order is placed by telephone). In such a case, other data may be extracted from the invoice, such as first and second trading partner IDs, contract information, and material group data. In some implementations, the data extraction step 715 may be performed on documents in a queue (e.g., a delta queue 372) according to rules contained in a data source processing block 374 (see FIG. 3).

The extracted data can then be manipulated or changed to include additional or alternative data that facilitates the subsequent identification of data responsive to user queries (step 720). The manipulation of the extracted data may involve the use of rules for converting the extracted data into a different format and/or mapping tables for selecting appropriate data from master data files. In some implementations, the data manipulation step 720 may be performed by an information source processing block 376 (see FIG. 3).

In one implementation, the global spend analysis might provide for the generation of spending reports by buying company, supplier family (e.g., as identified by a DUNS number), material group (e.g., a Universal Standard Products and Services Classification (UNSPSC) code, which is an open global coding system that classifies products and services), and contract, although other ways of reporting spending information are possible. Typically, this information will only be partially available in the documents that are routed through the marketplace. In addition, the information that is available will generally be in different formats depending on the type of backend system used by each marketplace participant.

For example, purchase orders originating from R/3 backend systems contain a company code for the buyer and a contract number, while purchase orders sent out of an EBP system identify a buying business partner and contract number. The supplier DUNS number and the UNSPSC code, however, are not contained in these documents. Instead, purchase orders originating from R/3 backend systems contain a local (i.e., specific to the particular R/3 backend system) vendor identifier and a local material group code, while purchase orders sent out of an EBP system identify a selling business partner and a product category.

It is possible that different backend systems may use the same attribute identifier for different buying companies, supplier families, material groups, and contracts. To make the attributes across the various backend systems unique for purposes of the global spend analysis, the various attributes may be appended to a system ID that is unique for every marketplace participant. For example, the system ID may be derived from the document destination ID (DDID) of the marketplace participant (e.g., the buyer) using a mapping function during the transformation step 720.

The buying company, vendor (i.e., supplier family), and material group are business objects that are represented by different attributes depending on the type of backend system, as demonstrated by the above discussion of the different information included in R/3 and EBP systems. These business objects are modeled as generic information objects that cover all the related attributes from different backend systems. The material group, for example, may be modeled as a generic material group object that covers the local material group from R/3 systems, the product category from EBP systems, and material group codes from other systems. Similarly, the generic buying company object may cover the buyer's company code from R/3 systems, the business partner from EBP systems, and buying company identifiers from other systems. The generic vendor object may cover the local vendor from R/3 systems, the business partner from EBP systems, and other types of sellers from other systems.

A combination of the system ID for the backend system and all of the local attributes (e.g., the local vendor (in R/3) and business partner (in EBP) for the generic vendor object) serve as navigational attributes for each generic information object, although only one of the local attributes typically has a valid value. Thus, the generic buying company object can be navigated using the system ID appended to the company code for R/3 systems, to the business partner for EBP systems, and/or to other appropriate buying company identifiers for other systems. The generic vendor object can be navigated using the system ID appended to the local vendor for R/3 systems, to the business partner for EBP systems, and/or to other appropriate seller identifiers for other systems. The generic material group object can be navigated using the system ID appended to the local material group for R/3 systems, to the product category for EBP systems, and/or to other appropriate material group identifiers for other systems.

Accordingly, the navigational attributes for each instance of the generic information objects may be a self-explanatory, unique key composed of the system ID (for identifying the backend system), an entity type flag (for identifying the type of generic information object), and the local attribute (for identifying a specific entity in the backend system). For example, an R/3 system with system ID "P01CLNT100" may include a particular material group that is identified with a local material group code "ABCD." The corresponding instance of the generic material group object may be represented by "P01CLNT100-MG-ABCD," where "MG" is the entity type flag for local material groups. The composition of the unique key may be performed using transfer rules during the transformation step 720.

In addition to the navigational attributes, special attributes may also be added during the transformation step 720 for purposes of subsequent reporting (e.g., by the marketplace data analysis application 390 of FIG. 3). For example, each generic vendor object instance may include an appropriate DUNS number. Each generic material group object instance may include an appropriate UNSPSC code. Each generic buying company object instance may include an appropriate global buying company identifier, which uniquely identifies each buying company in the marketplace.

Once the document data is extracted and any necessary data manipulation is performed, the data for the document is stored in a database (step 725). In some implementations, the database may be an operational data store 378 (see FIG. 3). In cases where an invoice corresponds to a purchase order and/or change order, certain data, such as the first and second trading partner IDs, contract information, and the material group identifier, may be taken from the original purchase order or change order and stored in the database entry for the invoice. Otherwise, these types of data may be stored in the database entry for the invoice based on data that is extracted (at step 715) from the invoice document. The database may include one or more database tables similar to the database table 500 of FIG. 5. The database table for storing global spend data may include a number of fields for storing the extracted data, as modified during the transformation step 720. Thus, the database table for storing global spend data may include fields for the trading partners, buying company, supplier family, material group, contract ID, date and time data, order quantity, order value, invoice item quantity, invoice value, and the like.

The stored document data is aggregated according to predefined criteria and over a predetermined time period (step 730), and the aggregated data is stored (step 735) (e.g., in an information cube 380 (see FIG. 3)). In one possible implementation, data may be aggregated according to organizational fields to provide a variety of key data figures. The aggregated data may be stored in an aggregated data storage table similar to the aggregated data storage table 600 of FIG. 6. Each entry in the global spend aggregated data storage table may represent a particular combination of the generic buying company, generic vendor, system ID, contract ID, generic material group, and time period (e.g., calendar month), as indicated in the organizational fields. Other organizational fields may also be included.

Each entry also includes a number of key data figures for the particular combination. The key data figures may include the committed spend amount and volume (an aggregation of the original order values and volumes, respectively), the actual amount spent and the actual volume with respect to the purchase order date, the actual amount spent and the actual volume with respect to the invoice date, the number of orders, the number of invoices, the number of change orders, the number of orders without invoices, and the average time between the order and invoice dates. Other key data figures can also be included. In some implementations, the global spend aggregated data storage table may be included in an information cube 380 (see FIG. 3).

A request for a global spend report is subsequently received (step 740). The request may be in the form of a predefined or a user-specified query. Responsive to the request, the stored aggregated data, and in some cases the stored document data, is accessed and a global spend report is generated (step 745). The global spend report can then be sent to the user that requested the report (step 750). In some implementations, the global spend report may be generated by a marketplace analysis application 390 and sent through a portal 320 and a network 315 to a user client 310 (see FIG. 3).

The global spend report may be generated based on a single entry or an aggregation of entries in the global spend aggregated data storage table, or based on a single entry or an aggregation of entries in the global spend database table. Global spend reports may provide data regarding a variety of different key data figures. Predefined queries may provide access to data at different levels of aggregation. For example, a query for committed and actual spend by vendor (e.g., DUNS number) and year provides the global spend, including the purchase order value and invoice value, by vendor. The query may initially result in maximal aggregation of the global spend data. The user may then choose from various characteristics to view the global spend data in greater detail (i.e., less aggregation). The characteristics may allow the user to further categorize the global spend data by buying company; vendor; UNSPSC code version; unique product ID; UNSPSC segment, family, class, or commodity; material group; contract; quarter; or month.

Another possible query may allow the user to view committed and actual spend (i.e., the purchase order value and invoice value) by buying company and year. The query may initially result in maximal aggregation of the global spend data. The user may then choose from various characteristics to view the global spend data in greater detail. The characteristics may allow the user to further categorize the global spend data by DUNS number; vendor; UNSPSC code version; unique product ID; UNSPSC segment, family, class, or commodity; material group; contract; quarter; or month.

Another query may show the committed and actual spend (i.e., the purchase order value and invoice value) by UNSPSC code version (or UNSPSC plus unique product ID) and year. The query may initially result in maximal aggregation of the global spend data. The user may then choose from various characteristics to view the global spend data in greater detail. The characteristics may allow the user to further categorize the global spend data by DUNS number; vendor; buying company; UNSPSC segment, family, class, or commodity; material group; contract; quarter; or month.

Another query may allow the user to view committed and actual spend (i.e., the purchase order value and invoice value) by contract and year. The query may initially result in maximal aggregation of the global spend data. The user may then choose from various characteristics to view the global spend data in greater detail. The characteristics may allow the user to further categorize the global spend data by buying company; DUNS number; vendor; UNSPSC code version; unique product ID; UNSPSC segment, family, class, or commodity; material group; quarter; or month.

Yet another possible query for actual spend (i.e., the invoice value) with and without a contract and by year may allow a user to view the global spend with and without a contract by UNSPSC segment. This type of query may show the total invoice value with a contract, the total invoice value without a contract, the total invoice value, and the percent without a contract. The query may initially result in maximal aggregation of the global spend data. The user may then choose from various characteristics to view the global spend data in greater detail (i.e., less aggregation). The characteristics may allow the user to further categorize the actual spend data by buying company; country of buying company; DUNS number; vendor; UNSPSC family, class, or commodity; material group; contract; quarter; or month. Such information may enable the user to determine if the enterprise is not receiving all of the rebates it is entitled to, to analyze the amount of any savings provided by a contract, or to identify purchases where additional savings could be obtained (i.e., by purchasing more or less products from particular suppliers).

Other types of queries may also be available or may be defined by the user based on the organizational structure of the data stored in the global spend aggregated data storage table and/or the global spend database table. In particular, it may be possible to obtain reports that group data based on any of the fields in the global spend aggregated data storage table and/or the global spend database table.

Figure 8:
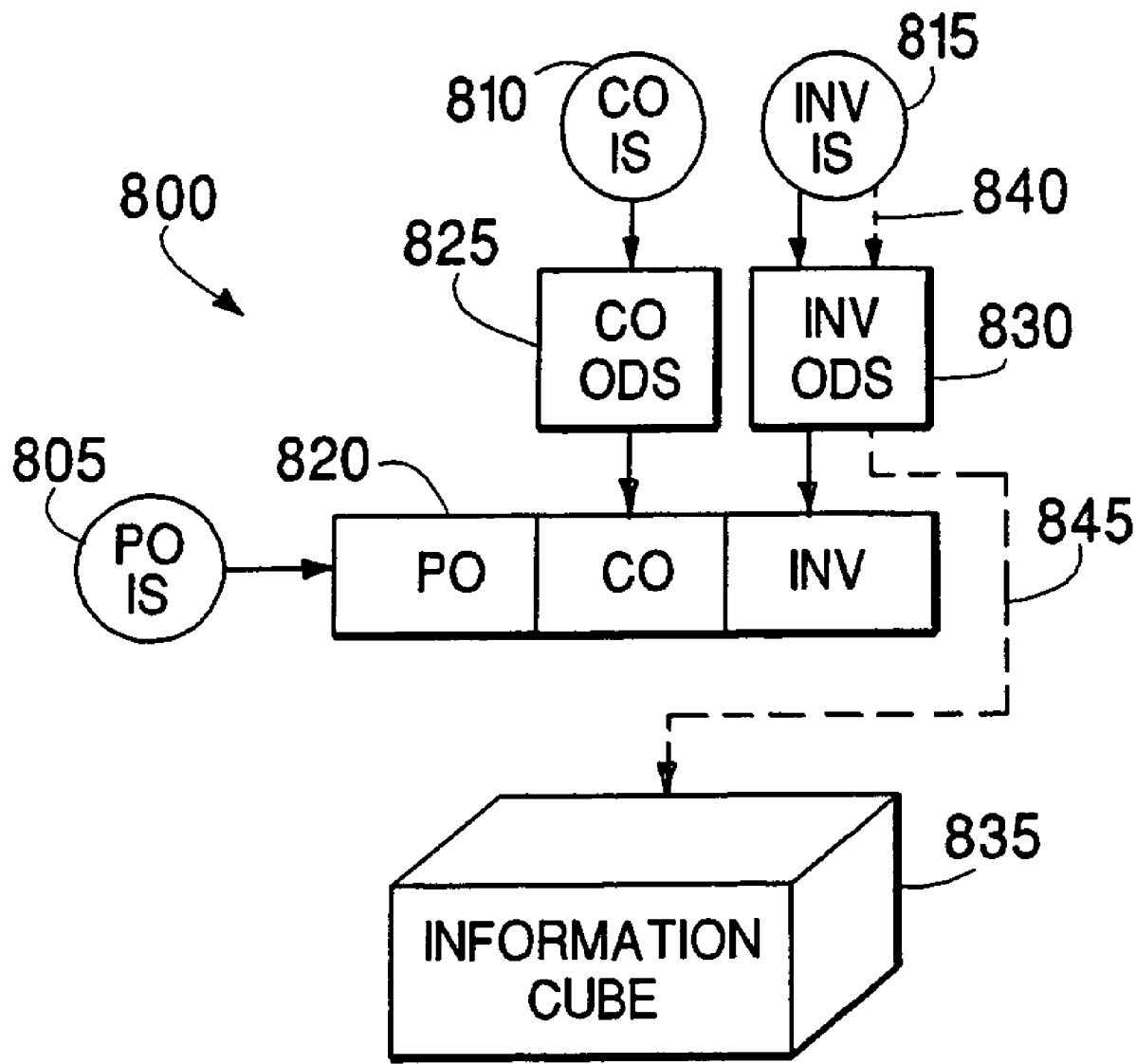
FIG. 8 is a schematic diagram of a data warehouse architecture that segregates data from different types of documents.

In some implementations of the system 300 for collecting and reporting trading data in an electronic marketplace 305 shown in FIG. 3, the data warehouse 370 may logically segregate data based on document type. FIG. 8 is a schematic diagram of a data warehouse architecture 800 that segregates data from purchase orders, change orders, and invoices. Other ways of segregating data by document type (or by other characteristics, such as material group) may also be used. The architecture includes a purchase order (PO) information source (IS) 805, a change order (CO) information source (IS) 810, and an invoice (INV) information source (IS) 815. Each of these information sources 805, 810, and 815 may obtain data from a corresponding delta queue.

Each information source 805, 810, and 815 provides document data to a corresponding operational data store (ODS) 820, 825, and 830. An order status ODS 820 store purchase order data in addition to incorporating change order and invoice data from a change order ODS 825 and an invoice ODS 830. More specifically, the change order ODS 825 and the invoice ODS 830 only store information for change order documents and invoice documents, respectively. The ODS associated with purchase orders, on the other hand, covers not only information from purchase orders, but also information from change orders and invoices, which allows all of the information for each transaction to be stored in an order status ODS 820. By storing all of the data for each transaction in the order status ODS 820, the system can conveniently track changes in the transaction order status and/or track the document flow for related transaction documents. A transaction, for example, may initially involve a purchase order for a certain quantity of products or services at a specified price. The buying company may subsequently submit a change order, in which the ordered quantity is modified. The selling company may then issue an invoice for the modified ordered quantity of products or services, in which the price is different than that specified in the original purchase order because of, e.g., a price change or a volume discount. By tracking all of various documents in the order status ODS 820, the system can conveniently provide reporting data for the entire transaction. Similarly, in the case of an implementation that tracks document traffic, the different ODS's 820, 825, and 830 can help track the number of transactions that do not have a purchase order or that do not have an invoice.

In operation, the order status ODS 820 is first supplied by the purchase order information source 805. Once all of the purchase orders for a specified time period are loaded into the order status ODS 820, the purchase order data can be enhanced by related transaction data from the change order ODS 825 and the invoice ODS 830. Thus, a database table in the order status ODS 820 may include separate fields for storing key figures from the purchase order (e.g., the original schedule line value, order price, order price unit, order currency, schedule line quantity, and order unit), the change order (e.g., the change order schedule line value, change order price, change order price unit, change order currency, change order schedule line quantity, and change order unit), and the invoice (e.g., the invoice quantity, invoice unit, invoice value, invoice net price, invoice price unit, and invoice currency). The enhanced data is then uploaded into the information cube 835.

To update the order status ODS 820 from the change order ODS 825, each change order corresponds to one purchase order record in the order status ODS 820, which correspondence may be determined from a correlation ID. The order status ODS 820 is enhanced by the actual values contained in the change order. Generally, only the key figures of the change order document are updated in the order status record. Attributes such as vendor and material group are generally defined by the purchase order. Updating of the order status ODS 820 from the invoice ODS 830 is performed in the same manner. However, there may be invoices without reference to a purchase order (as indicated at 840). Such invoices may not be updated to the order status ODS 820 but are updated directly into the information cube 835 (as indicated at 845).

In some cases, there may be multiple change orders that refer to the same purchase order. To make sure that the change order values are updated correctly, each ODS includes a timestamp field that is populated by the corresponding timestamp information from the document at issue (i.e., the change order document). This timestamp information indicates when the document was sent. The change order values are updated in the order status ODS 820 only if there is not another change order with a later timestamp relating to the same purchase order. Because this check for a later timestamp may be relatively time-consuming, it may be performed only for those documents that are processed from a dead message queue 385 as indicated by a "re-delivered" flag associated with the document (see FIG. 3).

If a purchase order sticks in the dead message queue 385, related change order and/or invoice documents could arrive in the data warehouse 370 before the corresponding purchase order. In such a case, a new record can be created in the order status ODS 820. The separate key figure fields in the new record for the change order and/or invoice documents can be updated even though the original purchase order data is not present. In addition, the fields that are the same across all of the different document types, such as the correlation ID, first and second trading partners, and material group, can also be updated from the first arriving document. Once the purchase order arrives from the dead message queue 385, the purchase order values may be automatically merged into the already existing record.

FIG. 1 is a block diagram illustrating an example data processing system 100 that may be used to implement an electronic marketplace. The data processing system 100 includes a central processor 110, which executes programs, performs data manipulations and controls tasks in the system 100. The central processor 110 is coupled with a bus 115 that can include multiple busses, which may be parallel and/or serial busses.

The data processing system 100 includes a memory 120, which can be volatile and/or non-volatile memory, and is coupled with the communications bus 115. The system 100 can also include one or more cache memories. The data processing system 100 can include one or more storage devices 130 for accessing a storage medium 135, which may be removable, read-only, or read/write media and may be magnetic-based, optical-based, semiconductor-based media, or a combination of these. The data processing system 100 can also include one or more peripheral devices 140(1)-140(n) (collectively, devices 140), and one or more controllers and/or adapters for providing interface functions.

The system 100 can further include a communication interface 150, which allows software and data to be transferred, in the form of signals 154 over a channel 152, between the system 100 and external devices, networks or information sources. The signals 154 can embody instructions for causing the system 100 to perform operations. The system 100 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 100 and/or delivered to the machine 100 over a communication interface. These instructions, when executed, enable the machine 100 to perform the features and function described above. These instructions represent controllers of the machine 100 and can be implemented in a high-level procedural and/or object-oriented programming language, and/or in assembly/machine language. Such languages can be compiled and/or interpreted languages.

The system 100 can be used to implement an electronic marketplace in which documents or messages are sent and received over the channel 152 and are processed and routed by the central processor 110 acting in accordance with instructions stored in the memory 120 and/or storage device 130.

The systems and techniques described here can be implemented in a computing system that includes a backend component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such backend, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although only a few embodiments have been described in detail above, other modifications are possible. Portions of this disclosure discuss use of the systems and techniques to provide document flow analysis and global spend analysis, but the systems and techniques can also be used to provide other forms of analysis on documents and/or transactions that pass through an electronic marketplace. The logic flows depicted in FIGS. 2, 4, and 7 do not require the particular order shown, or sequential order, to achieve desirable results. For example, the transformation of documents (steps 215, 410, and 710) and the manipulation of data (steps 420 and 720) may be performed at many different places within the overall process. In certain implementations, multitasking and parallel processing may be preferable. For example, the generation and storage of aggregated data (steps 430, 435, 730, and 735) may occur in parallel with the storage of document data (steps 425 and 725). In addition, the processing and storage of document and aggregated data (steps 205-225, 405-435, and 705-735) may be constantly evolving even as reports are being requested, generated, and viewed (steps 230, 440-450, and 740-750).

Other embodiments may be within the scope of the following claims.

What is claimed is:

1. A computer implemented method for processing data in an electronic marketplace, the method comprising:
   receiving documents sent through the electronic marketplace;
   extracting data from the documents, wherein the extracted data relates to a predetermined statistical category of transactions conducted through the electronic marketplace and the extracted data for each document includes information identifying a document type;
   storing the extracted data for each document;
   aggregating the stored data according to the predetermined statistical category, wherein aggregating the stored data includes aggregating the stored data by document type to identify a quantity of documents for the predetermined statistical category;
   receiving a query for a statistical category of data; and
   presenting information from the appreciated data in response to the received query, wherein the presented information includes a number of documents sent through the electronic marketplace by an entity, a time period, and a document type associated with the documents.

2. The method of claim 1 further comprising filtering the documents to identify relevant documents prior to extracting data from the documents.

3. The method of claim 1 further comprising transforming each document from a format used by the electronic marketplace into a predefined format used for extracting data.

4. The method of claim 3 wherein transforming each document further comprises retrieving data from a master database and inserting the retrieved data into the document, wherein the retrieved data is selected based on information contained in the document.

5. The method of claim 1 wherein storing the extracted data for each document comprises:
   identifying a transaction with which each document is associated; and
   linking data from documents that are associated with the same transaction.

6. The method of claim 1 wherein the extracted data for each document includes information identifying at least one trading partner associated with the document and aggregating the stored data includes aggregating the stored data by trading partner.

7. The method of claim 1 wherein the extracted data for each document includes information identifying a date associated with the document and aggregating the stored data includes aggregating the stored data by time period.

8. The method of claim 1 wherein the documents sent through the electronic marketplace comprise sequences of documents having different document types, each sequence of documents relating to information for a corresponding transaction communicated between a first trading partner for the transaction and a second trading partner for the transaction.

9. A system for processing data in an electronic marketplace, the system comprising:
   one or more processor executing an electronic marketplace; and one or more memory storing:

a database for storing documents transmitted via the electronic marketplace;

a data warehouse for storing statistical data relating to documents sent via the electronic marketplace, wherein information corresponding to predetermined statistical categories is extracted from the documents stored in the database to generate the statistical data and the statistical data comprises a number of documents transmitted via the electronic marketplace for at least one statistical category; and a reporting application for accessing the data warehouse to retrieve statistical data and for generating reports representing aggregated statistical data, and for representing statistical data retrieved from the data warehouse in response to a query for a category of statistical data, wherein the presented information includes a number of documents transmitted via the electronic marketplace by an entity, a time period, and a document type associated with the documents.

10. The system of claim 9 further comprising a knowledge base for retrieving information corresponding to at least one predetermined statistical category based on data contained in the documents.

11. The system of claim 9 wherein the data warehouse includes an operational data storage repository for storing information on individual documents and an aggregated data repository for storing statistical data aggregated by statistical categories.

12. The system of claim 9 wherein the reporting application is operable to generate at least one report selected from the group consisting of a report relating to a number of documents transmitted via the electronic marketplace by document type and trading partner, a report relating to a number of documents transmitted between a pair of trading partners, and a report relating to a number of documents transmitted by document type.

13. The system of claim 9 wherein the electronic marketplace facilitates an exchange of documents between a first trading partner and a second trading partner.

14. An article comprising a machine-readable storage medium storing instructions operable to cause one or more machines to perform operations comprising:

receiving documents sent through an electronic marketplace;

extracting data from the documents, wherein the extracted data relates to a predetermined statistical category of transactions conducted through the electronic marketplace;

storing the extracted data;

aggregating the stored data according to the predetermined statistical category, wherein aggregating the stored data according to the predetermined statistical category comprises determining a number of documents transmitted through the electronic marketplace for the predetermined statistical category;

receiving a query for a statistical category of data; and presenting information from the appreciated data in response to the received query, wherein the presented information includes a number of documents sent through the electronic marketplace by an entity, a time period, and a document type associated with the documents.

15. The article of claim 14 wherein the machine-readable medium stores instructions operable to cause one or more machines to perform operations further comprising storing additional information for each document, wherein the additional information is based on master data that corresponds to data contained in the document.

16. The article of claim 15 wherein a trading partner directory includes the master data, and the additional information includes a trading partner identifier associated with the document.

17. The article of claim 14 wherein the machine-readable medium stores instructions operable to cause one or more machines to perform operations further comprising generating a report based on the aggregated data.

18. The article of claim 17 wherein the machine-readable medium stores instructions operable to cause one or more machines to perform operations further comprising: receiving a request for additional detail relating to the report; and reporting on extracted data corresponding to individual documents that relate to the aggregated data.

19. The article of claim 14 wherein storing the extracted data comprises storing a date, a document type, and at least one trading partner identifier for each document.

20. The article of claim 19 wherein: the predetermined statistical category is defined by at least one parameter selected from the group consisting of a time period, a trading partner, a pair of trading partners, and a document type; and aggregating the stored data according to the predetermined statistical category comprises calculating a number of documents for the predetermined statistical category.

21. The article of claim 14 wherein the documents sent through the electronic marketplace comprise transaction information exchanged between a buying party and a selling party.

* * * * *

UNITED STATES PATENT AND TRADEMARK OFFICE
CERTIFICATE OF CORRECTION

| | |
|---|---|
| PATENT NO. | : 7,584,192 B2 |
| APPLICATION NO. | : 10/400172 |
| DATED | : September 1, 2009 |
| INVENTOR(S) | : Rey et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1309 days.

Signed and Sealed this

Fourteenth Day of December, 2010

David J. Kappos
*Director of the United States Patent and Trademark Office*